Sept. 29, 1942.  F. KRATZMANN  2,297,480
CENTRIFUGAL PISTON CLUTCH
Filed Jan. 27, 1941
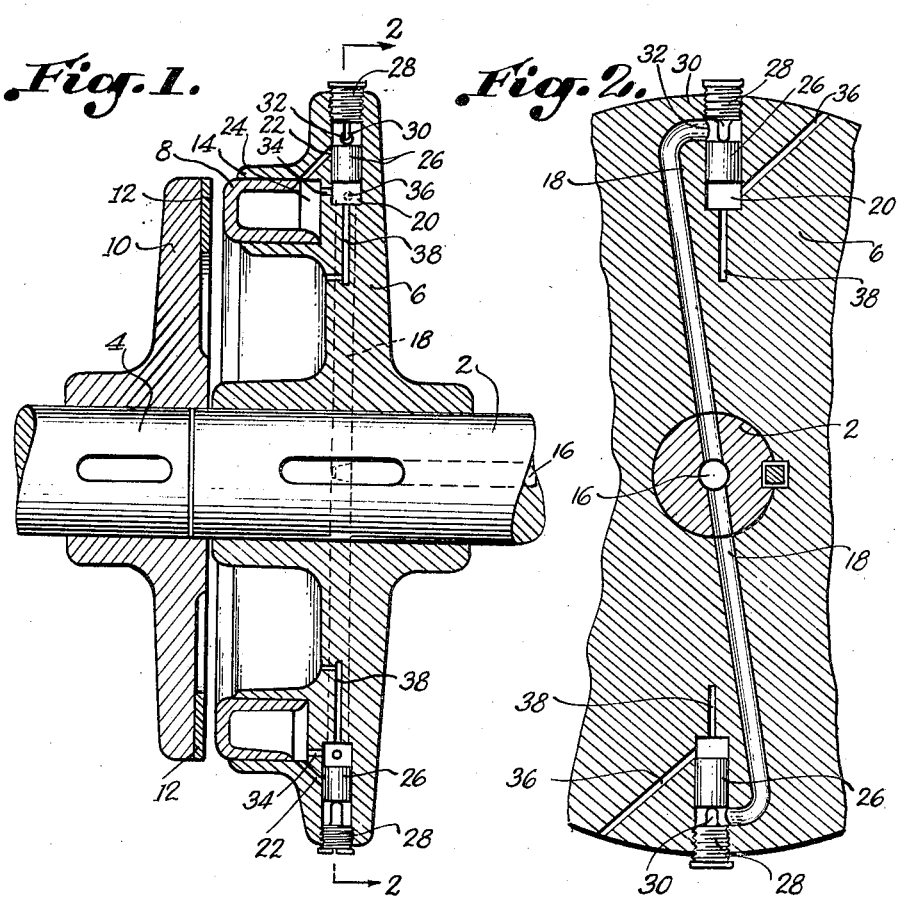
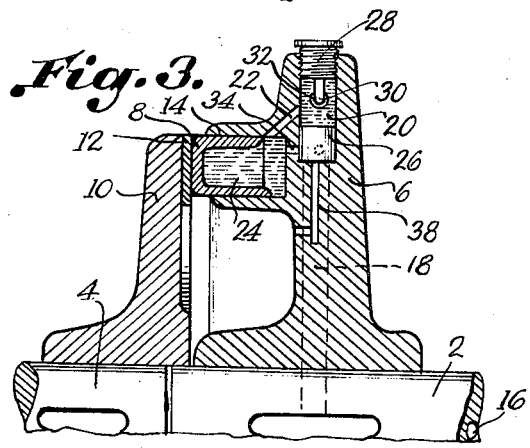
Inventor,
FRANZ KRATZMANN,
By Bailey, Stephens & Huettig
ATTORNEYS Patented Sept. 29, 1942

2,297,480

UNITED STATES PATENT OFFICE 2,297,480

CENTRIFUGAL PISTON CLUTCH

Franz Kratzmann, Dessau, Germany; vested in the Alien Property Custodian

Application January 27, 1941, Serial No. 376,248
In Germany October 11, 1939

6 Claims. (Cl. 192—85)

This invention is directed to a hydraulically operated friction clutch for connecting rotating shafts. More particularly the invention is directed to the construction of centrifugally operated valves in the clutch for releasing the clutch when maximum permissible shaft speeds are reached.

In hydraulically operated friction clutches of this type, one clutch plate is pressed against another by means of hydraulic pressure. When the maximum allowable speed between the driving and driven members is reached, centrifugally operated valves carried by one of the members cause a release of fluid pressure, thus disengaging the clutch plates. The hydraulically movable clutch plate is usually on the driving member, and the valves are mounted on the periphery of the clutch disc. In heretofore known constructions, such valves consisted of pistons movable in one direction by the flow of the pressure fluid, and movable in the opposite direction by a spring. These valves must be so adjusted that the centrifugal forces which act on the fluid, and on the piston, are balanced by the feed pressure of the fluid. Such a structure means that there is produced in the valve a speed responsive relationship between the forces for operating the valve. This relationship is objectionable because it is not reliable if the clutch is to be operated over widely varying speed ranges. Within such a range, speeds may be reached which will inadvertently cause the clutching members to be engaged or released, thus making the performance of the clutch unpredictable and inaccurate. Furthermore, it is difficult to produce springs having accurately calculated resilient forces which retain their accuracy throughout a wide range.

An object of this invention is to produce a centrifugally operated springless valve for regulating a hydraulically operated clutching mechanism.

Another object of this invention is to produce a hydraulic clutch for rotating shafts in which centrifugally operated release valves without springs are used to declutch the shafts when maximum permissible shaft speeds are reached.

A further object of this invention is to produce a centrifugally operated release valve for a hydraulic clutch in which the feed pressure of the fluid for hydraulically operating the clutch is balanced against the centrifugal force of a movable mass in the valve mechanism.

Generally, these objects are obtained by utilizing a freely movable mass mounted within a radially extending cylinder in the driving member of the clutch. Fluid for operating the clutch displaces the piston. If the speed of rotation of the clutch increases beyond desirable limits, the centrifugal force will displace the freely movable mass outwardly against the force of the fluid feed pressure, and will allow the fluid to escape from the clutch cylinder, whereupon the clutch is disengaged. A plurality of similar peripherally arranged valves may be used for a common clutch cylinder. Each valve is provided with an adjusting member for limiting the displacement of the freely movable piston.

A means by which these objects may be obtained is more fully described with reference to the accompanying drawing in which:

Fig. 1 is a cross-sectional view through a clutch including a valve constructed according to this invention, the valve being shown in position to hold the clutch disengaged;

Fig. 2 is a partial cross-sectional view on the line 2—2 of Fig. 1; and

Fig. 3 is a cross-sectional view similar to Fig. 1, but showing the valve positioned for effecting a clutching of the driving and driven members.

As shown in Fig. 1, the clutch is mounted upon a driving shaft 2 and a driven shaft 4. One-half of the clutch consists of a circular plate 6 provided with a hydraulically movable piston type clutch plate 8 transversely fixed to shaft 2. Driven shaft 4 has the other half of the clutch which consists of a circular disc 10 fixed thereto and provided with a clutching surface 12.

In Figs. 1 and 3, the piston clutch plate 8 is shown as a hollowed open sided annulus movably mounted in an annular piston cylinder 24 having parallel walls 14. Fluid for operating piston 8 is provided from a source of pressure, as from a pump, through bore 16 in shaft 2, bore 18 radially extending through disc 6, note Fig. 2, valve chamber 20, and bore 22 connecting valve chamber 20 with piston cylinder 24.

Valve chamber 20 is composed of a bore radially extending inwardly from the periphery of disc 6. Mounted within chamber 20 is a freely slidable mass in the form of a piston 26, the outward displacement of which is adjustably limited by a threaded plug 28 provided with an inwardly directed stop pin 30. Bore 18 communicates with chamber 20 adjacent the outer portion thereof through port 32, this port being more outwardly in the chamber than the port of bore 22. A pressure release system for chamber 24 is achieved by means of a bore 34 extending from cylinder 24 into chamber 20, adjacent the innermost end of chamber 20, and a bore 36 extending from adjacent the inner end of chamber 20 to the periphery of disc 6. A second pressure release bore 38 extends from the innermost end of chamber 20 toward the center portion of disc 6. The length of the piston 26 is such that when the port to bore 22 is covered the pressure release ports are uncovered, and vice versa, as shown in Figs. 1 and 3. It is noted that adjusting pin 30 keeps the port 32 continually open.

In operation, fluid under feed pressure entering bore 16 in driving shaft 2 passes through bore 18, port 32, into chamber 20, and forces piston valve 26 radially inwardly so that communication into cylinder 24 is established through bore 22. Fluid under pressure forces annular piston 8 outwardly and into frictional engagement with clutch plate 12, thus causing driven shaft 4 to be rotated by shaft 2. When the maximum allowable speed of rotation is exceeded, the centrifugal force will cause mass 26 to be displaced against the feed pressure of the fluid entering bore 16, and piston 26 will move from the position shown in Fig. 3 to that shown in Figs. 1 and 2. In this new position, piston 26 closes off communication between bores 18 and 22, and opens communication between bores 24 and both bores 36 and 38 so that fluid will be released from cylinder 24, thus allowing annular piston 8 to move toward disc 6 and disengaging the driving and driven members. Mass 26 and the fluid feed pressure can, of course, be calculated to operate the valve at any given speed of shaft rotation. The pressure medium, as for example oil, can be collected by suitable collecting means as it is discharged from bores 36 or 38. As soon as the speed of driving member 2 has dropped so that the feed pressure of the fluid is greater than the centrifugal force acting upon piston mass 26, the mass will drop from the position shown in Fig. 1 to that shown in Fig. 2, and piston 8 will be actuated to again engage face 12 of disc 10.

A characteristic of this valve is its snap-action when moved outwardly by centrifugal force. This is because the inner face of mass 26 seats on the bottom of chamber 20 at low speeds of the clutch. An air cushion beneath mass 26 is prevented by the vent 38. Oil or other liquid deposits on the bottom of chamber 20 causes the mass 26 to stick to the chamber bottom beyond the speed of clutch rotation which would cause an unstuck mass to move. When the clutch speed becomes great enough, the mass suddenly breaks loose from the bottom of the chamber, and substantially instantly moves against stop pin 30. Consequently the mass 26 moves suddenly, rather than slowly, and does not leave the port to bore 22 partially open for any appreciable length of time. The advantage is in preventing the clutch from slipping, because if the pressure is only partially released from piston 8, slipping and wear will take place between it and plate 12, this condition being aggravated as the clutch elements are being rotated at their maximum allowable speed.

As before stated, a plurality of these valves may be arranged around the periphery of disc 6, although for the sake of simplicity of disclosure only two valves are shown in the drawings. All the valves, of course, communicate with cylinder 24.

It is therefore seen that the invention achieves an automatic disengagement of the clutch members by providing a freely moving piston mass so selected that the centrifugal force developed upon its mass will overcome the feed pressure of the hydraulically operating fluid for the clutch, when allowable speeds are exceeded. The clutch therefore provides a simple and reliable protection against excess speed, and is not open to the objectionable use of spring members.

Having now described the means by which the objects of the invention are achieved, I claim:

1. In combination of a friction disc clutch for connecting a driving shaft to a driven shaft, a hydraulic piston for actuating said clutch, a fluid supply system for said piston, and a valve in said system, said valve comprising a radially extending bore mounted upon one of the shafts, a mass in said bore movable radially of the shaft carrying said bore, conduit means for providing communication through said bore from said supply system to said piston when said mass is displaced toward the shaft carrying said valve, second conduit means for releasing fluid from said piston through said bore when said mass is displaced outwardly from said carrying shaft by centrifugal force, and an adjustable stop member for limiting the radially outward displacement of said mass.

2. A hydraulically operated friction clutch comprising a driving shaft, a driven shaft, a radially extending clutching disc upon each shaft, a hydraulic piston mounted upon the disc upon said driving shaft for the purpose of engaging the discs, a fluid conduit in said driving shaft adapted to be supplied with fluid from a source of fluid under pressure, a radially extending conduit in said piston carrying disc communicating with said shaft conduit, a radially extending valve chamber in said piston carrying disc in communication with said radially extending conduit adjacent the outermost end of said chamber, an inlet conduit between said hydraulic piston and the outermost end of said chamber, an outlet conduit between said hydraulic piston and the innermost end of said chamber, an exhaust conduit between said innermost end of said conduit and the periphery of said disc, and a member freely slidable radially in said chamber, said member having a length such that when either said inlet or outlet conduit is covered by said member the other is uncovered, and said member having a mass such that upon a predetermined shaft speed said member will be displaced against the fluid pressure and close said inlet conduit whereby said clutch is disengaged.

3. A clutch as in claim 2, an adjustable plug extending from the periphery of said piston carrying disc into said chamber, and a stop pin carried by said plug for limiting the outward displacement of said member and for preventing said member from closing the communication between said radially extending conduit and said chamber.

4. A clutch as in claim 2, a second exhaust conduit extending from said chamber toward said driving shaft.

5. In the combination of a hydraulically operated clutch adapted to connect two rotating elements, a fluid supply and release system for said clutch, and a centrifugally operated valve in said system, said valve comprising a chamber disposed with its longitudinal axis radially of the axis of rotation of said elements, a mass in said chamber and movable therein to seated engagement with the inner radial end of said chamber, and suddenly displaceable therefrom under centrifugal force to overcome the pressure of the fluid supplied to said clutch for shutting off the fluid supply to said clutch.

6. In the combination of claim 5, a vent communicating with said inner chamber end whereby the formation of an air cushion between said mass and end is prevented.

FRANZ KRATZMANN.